United States Patent
Sayegh

(10) Patent No.: US 6,175,720 B1
(45) Date of Patent: Jan. 16, 2001

(54) PAGING CELLS & PAGING TIME PLANS FOR NON-GEOSTATIONARY SATELLITE SYSTEM

(75) Inventor: Soheil Sayegh, Gaithersburg, MD (US)

(73) Assignee: Comsat Corporation, Bethesda, MD (US)

(*) Notice: Under 35 U.S.C. 154(b), the term of this patent shall be extended for 0 days.

(21) Appl. No.: 08/630,343

(22) Filed: Apr. 10, 1996

(51) Int. Cl.⁷ .................................................. H04B 7/195
(52) U.S. Cl. .......................................... 455/13.2; 455/502
(58) Field of Search .................................. 455/427, 429, 455/12.1, 13.1, 13.2, 13.3, 502, 574, 38.3, 343

(56) References Cited

U.S. PATENT DOCUMENTS

| | | |
|---|---|---|
| 5,239,668 | 8/1993 | Davis . |
| 5,274,843 | 12/1993 | Murai et al. . |
| 5,317,562 | 5/1994 | Nardin et al. . |
| 5,392,287 | 2/1995 | Tiedemann, Jr. et al. . |
| 5,392,457 | 2/1995 | Davis et al. . |
| 5,396,643 | 3/1995 | Frenzer et al. . |
| 5,430,732 | 7/1995 | Lee et al. . |
| 5,548,801 | 8/1996 | Araki et al. . |
| 5,579,536 | 11/1996 | Stackman et al. . |
| 6,070,050 | * 5/2000 | Penny, Jr. .............................. 455/12.1 |

* cited by examiner

Primary Examiner—Nguyen Vo
(74) Attorney, Agent, or Firm—Sughrue, Mion, Zinn Macpeak & Seas, PLLC (57) ABSTRACT

In a method of synchronizing mobile communication devices employed in a non-geostationary satellite communication system according to a paging time plan using geographical paging cells, a geographical region is segmented into a plurality of the geographical paging cells, the mobile communication devices are divided into subgroups according to their location in one of the geographical paging cycles. A plurality of beams are transmitted from non-geostationary satellites to the mobile communication devices positioned within the geographical paging cells according to the paging time plan. The paging time plan requires that each of the beams be transmitted in at least one frame including at least one paging cycle having a plurality of time slots. The time slots occur at fixed intervals relative to time slots occurring in paging cycles of subsequent occurring frames. In each of the plurality of time slots, one of the plurality of beams is targeted to at least a portion of one of the plurality of geographical paging cells not targeted by other ones of the plurality of beams.

6 Claims, 9 Drawing Sheets

| LOCATION | RANDOM A | RANDOM B |
|---|---|---|
| CELL 0 | IDA 0 | IDB 0 |
| CELL 1 | IDA 1 | IDB 1 |
| CELL 2 | IDA 2 | IDB 2 |
| CELL 3 | IDA 3 | |
| | | IDB 34 |
| CELL 96 | IDA 96 | IDB 96 |
| CELL 97 | IDA 97 | IDB 97 |
| CELL 98 | IDA 98 | IDB 98 |
| CELL 99 | IDA 99 | IDB 99 |

PAGING CELLS & PAGING TIME PLANS FOR NON-GEOSTATIONARY SATELLITE SYSTEM

FIELD OF THE INVENTION

The present invention relates to non-geostationary satellite communication systems such as Inmarsat-P, Iridium, Globalstar, and Odyssey. Specifically, the present invention is directed to a method of synchronizing mobile or hand-held communication devices employed in a non-geostationary satellite communication system.

BACKGROUND OF THE INVENTION

In non-geostationary satellite communication systems, earth stations must transmit signals to mobile or hand-held communication devices (also known as user terminals) via satellite on a regular basis for synchronization, paging, and short message delivery. The mobile or hand-held communication devices, also known as user terminals, each include a receiver to facilitate communication with non-geostationary satellites. Mobile or hand-held communication devices may be equipped with transmitters as well as receivers depending on the capability of the system.

One limiting constraint placed on hand-held communication devices employed in non-geostationary satellite communication systems is that they must be turned on in order to receive any signals. Therefore, each hand-held communication device should have a sleep/wake cycle with short wake intervals between long sleep intervals in order to conserve battery power.

To ensure that each hand-held communication device has a sleep/wake cycle with short wake intervals between long sleep intervals, the hand-held communication devices, which generally are grouped together, are divided into subgroups. Each hand-held communication device associated with a particular subgroup wakes at specified intervals. If a hand-held communication device assigned to a particular subgroup wakes only during specific time intervals, and there are a large number of subgroups, the wake time of the hand-held communication device will be short relative to its sleep time. When a hand-held communication device has a long sleep time relative to its waking time, battery power in the device may be conserved.

Tiedemann, Jr. et al., U.S. Pat. No. 5,392,287, which is incorporated herein by reference, teaches a system for reducing receiver power consumption in battery-powered communication devices having a transmitter and one or more receivers. The system assigns each receiver to a particular time slot during which the device will enter an active state so that it can receive or transmit messages. When the battery powered communication device is not in an active state, it may perform a non-communication related function, or conserve battery power. The communication device disclosed by Tiedemann, Jr. et al. may be periodically or continuously synchronized.

Davis et al., U.S. Pat. No. 5,392,457, which also is incorporated herein by reference, also teaches a battery saving scheme in which the receiving functions of a battery powered communication receiver are supplied selectively with power so that the receiver may receive a coded message signal.

Murai et al., U.S. Pat. No. 5,274,843, which also is incorporated herein by reference, teaches a paging apparatus having a battery saving function. The paging apparatus is periodically turned on in synchronization with the detection of synchronization signals and is turned off in response to the detection of a specific code.

When a hand-held communication device is awake, it can receive transmission bursts from the non-geostationary satellites. The bursts transmitted by each non-geostationary satellite serve two functions simultaneously: synchronization and information delivery. There are two situations when synchronization signals are needed. In the first situation, a hand-held communication device which is not synchronized to the system must acquire transmissions when the device is initially provided with power without knowing when a burst is going to arrive.

In a second situation in which synchronization signals are needed, a hand-held communication device that is synchronized to the system knows approximately the time slots when bursts may be arriving. However, because of clock drifts within the hand-held communication device, the device requires synchronization updates every few minutes.

In order to provide sufficient power for operation within a building, high penetration paging signals are transmitted from the non-geostationary satellites one at a time. In any given time interval, one beam is selected and a high power signal is transmitted in that beam. As the beams move across the surface of the earth, the mapping between fixed ground locations and satellite beams constantly changes.

Davis, U.S. Pat. No. 5,239,668, incorporated herein by reference, discloses a satellite signalling system employing a synchronous satellite whose position relative to the earth remains fixed during transmissions. The synchronous satellite includes a steerable antenna which transmits a beam containing transmissions received from an earth-bound station to pagers which are positioned at various points on the earth's surface. As the beam moves from one location to the next, synchronization signals for different groups of pagers in a location covered by the beam are transmitted to the earth. Once synchronized, the pagers can adjust their power consumption circuitry to conserve power.

One conventional method of synchronizing hand-held communication devices employs an indirect addressing scheme in which the scheduling of transmissions is performed according to a particular beam number. Indirect addressing is addressing in which a hand-held communication device listens to transmissions in the beam currently positioned over the device to find out the time intervals during which the device must wake in order to receive future transmissions.

The disadvantage of the conventional method is the lack of robustness associated with indirect addressing schemes. If a user's hand-held communication device does not know the time interval during which it must wake to receive a current transmission, then it will not be able to tell in which time slot it must wake to receive future transmissions.

SUMMARY OF THE INVENTION

In view of the foregoing, it is an object of the present invention to provide a robust way for mobile and hand-held communication devices to acquire synchronization updates, even from a cold start, in order to overcome the above mentioned disadvantage.

In order to carry out the above and other objects of the invention, a method of synchronizing mobile communication devices employed in a non-geostationary satellite communication system according to a paging time plan using geographical paging cells is provided in accordance with a first embodiment of the invention.

According to this method, a geographical region is segmented into a plurality of the geographical paging cells, and the mobile communication devices are divided into subgroups according to their location in one of the geographical paging cells. A plurality of beams are transmitted from non-geostationary satellites to the mobile communication devices positioned within the geographical paging cells according to the paging time plan.

According to the geographic time plan, each of the beams are transmitted during at least one time frame including at least one paging cycle having a plurality of time slots. The time slots occur at fixed intervals relative to time slots occurring in paging cycles of subsequent frames. During each of the plurality of time slots, one of the plurality of beams is targeted to at least a portion of one of the geographic paging cells not targeted by other ones of the plurality of beams so that mobile communication devices within the targeted cell may receive synchronization signals from the non-geostationary satellites.

According to an aspect of the first embodiment of the invention, each of the beams is transmitted in a different order during a plurality of time frames.

According to another aspect of the first embodiment, the time slots are of equal duration.

According to yet another aspect of the first embodiment of the invention, the plurality of beams are transmitted from an earth station.

According to a second embodiment of the invention, the plurality of beams cover all of the geographical region during each paging cycle so that mobile communication devices which are beginning from a cold start may receive synchronization signals from the non-geostationary satellites.

Each time frame may comprise a paging cycle based on a non-geographic assignment scheme.

BRIEF DESCRIPTION OF THE DRAWINGS

These and other features, aspects and advantages of the present invention will become better understood with reference to the following description, appended claims, and accompanying drawings, in which:

DETAILED DESCRIPTION OF THE PREFERRED EMBODIMENTS

The present invention is directed to a method of synchronizing mobile communication devices employed in a non-geostationary satellite system according to a paging time plan using geographical paging cells. The invention advantageously coordinates the synchronization of hand-held communication devices based on fixed time intervals.

According to the paging time plan, synchronization bursts are transmitted to hand-held communication devices at regular intervals so as to keep the receiver complexity at a minimum. Each hand-held communication device is positioned within a paging cell. Each paging cell is assigned a number (type), with the number of different types equal to the number of spot beams.

Figure 1:
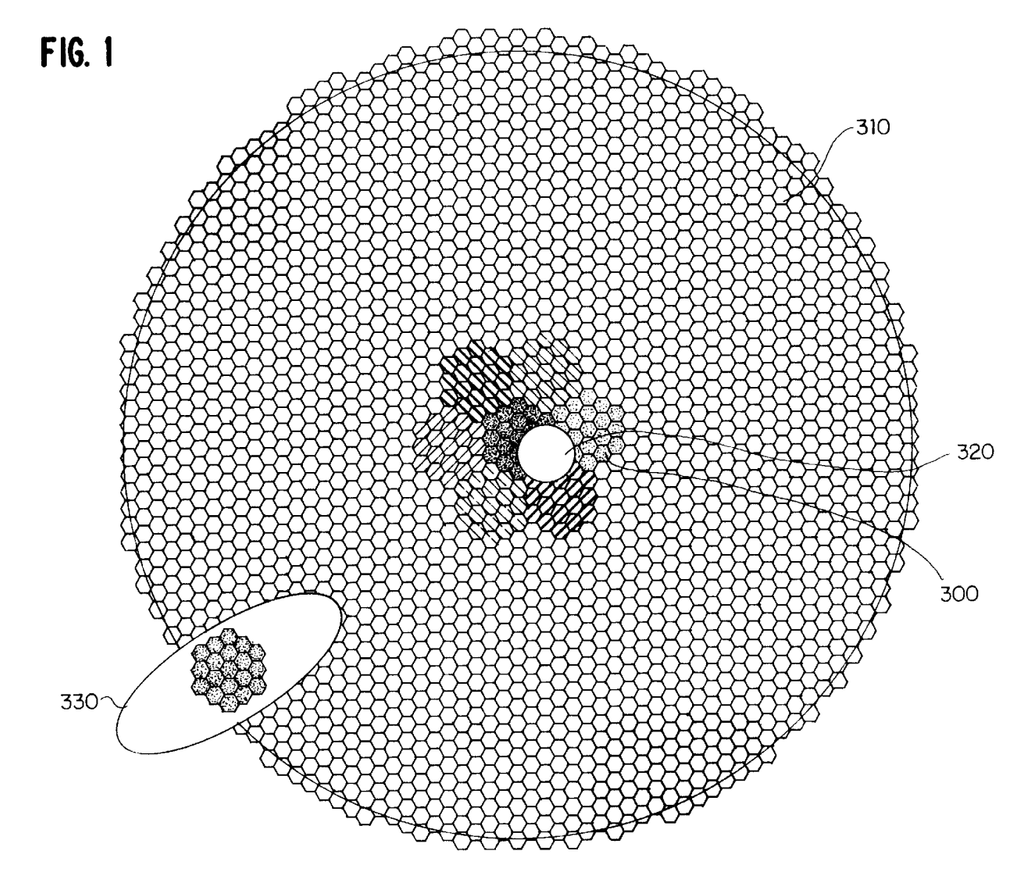
FIG. 1 shows non-geostationary satellite beam coverage of the surface of the earth which has been segmented into paging cells that are divided into minicells.

As illustrated in FIG. 1, the entire surface of the earth is tiled with cells 300. Each cell is divided into a number of minicells 310, with the size of each minicell chosen small enough so that its location determines the position of the hand-held communication device positioned within it with sufficient accuracy. A nadir beam 320, which is a beam that is targeted at a cell 300 directly beneath the satellite, covers a portion of the cell 300, while an edge beam 330 is targeted at a cell on the periphery of the earth's horizon.

The size of the minicell should be sufficiently large to avoid having to keep track of too many minicells. Minicells are used for bookkeeping functions at the satellite access nodes (SANs). A SAN consists of a satellite earth station along with associated switches and databases.

Figure 2:
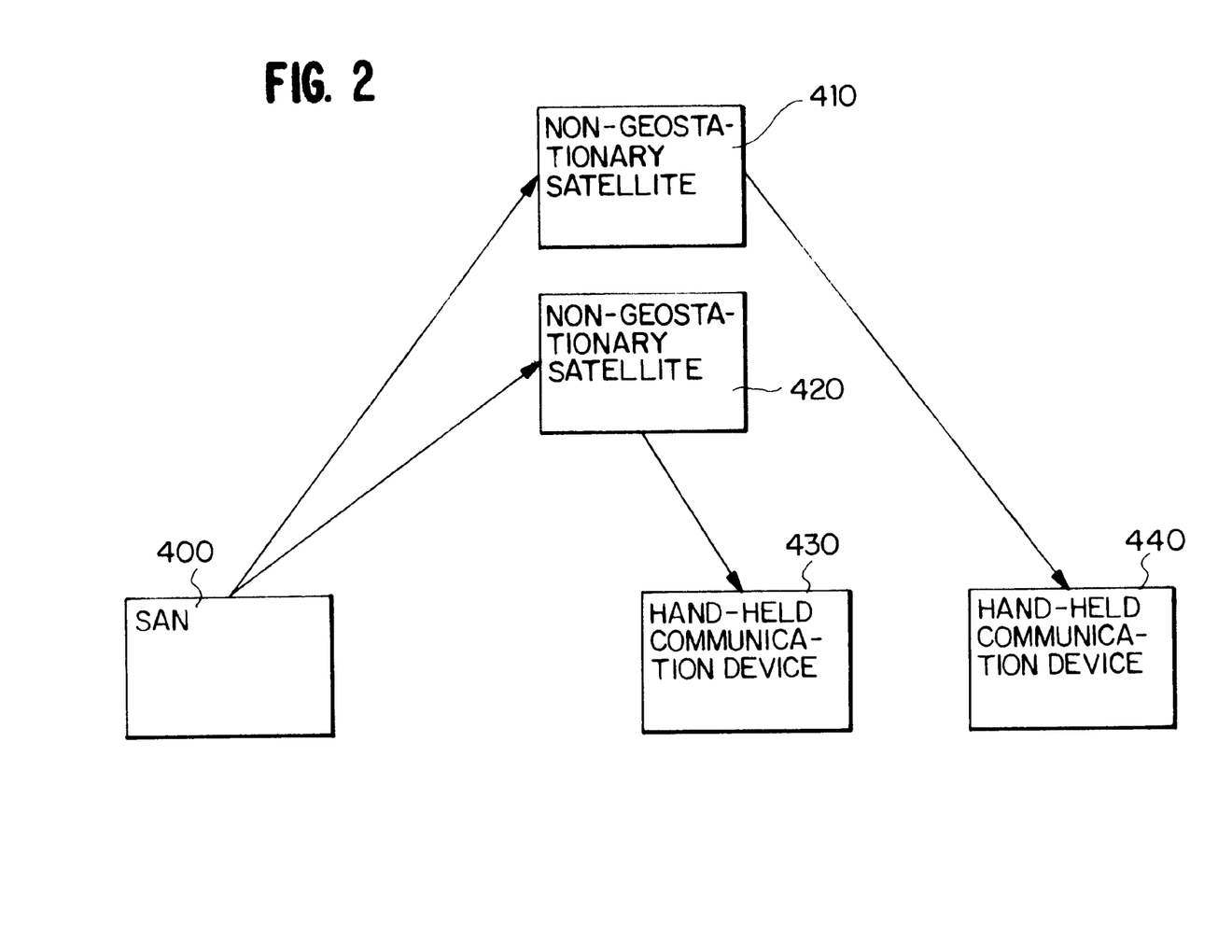
FIG. 2 shows the components which constitute an exemplary non-geostationary satellite communication system.

In an exemplary non-geostationary satellite system, communication signals are transmitted from a SAN 400 to non-geostationary satellites 410 and 420, as shown in FIG. 2. The non-geostationary satellites then transmit signals via satellite beams to hand-held communication devices 430 and 440 situated in paging cells located on the earth.

Figure 3:
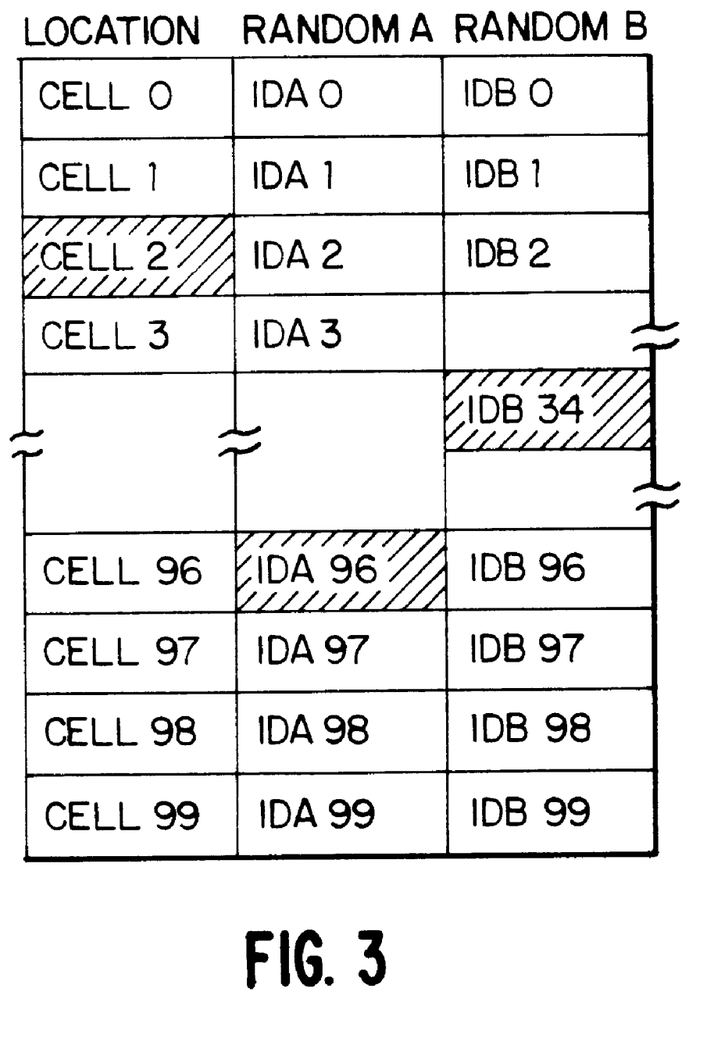
FIG. 3 shows a table of group assignments for hand-held communication devices which are employed in a non-geostationary satellite communication system.

FIG. 3 illustrates an example in which, for simplicity of illustration, it is assumed that there are a hundred spot beams. Thus, a hundred cell types are used with hand-held communication devices being divided into one-hundred subgroups for each type of paging cycle. In addition, each hand-held communication device wakes in one slot per paging cycle of one-hundred slots, resulting in a duty factor of 1% per satellite.

Three different kinds of paging cycles may be utilized in a paging time plan. The first kind which is essential to the present invention is called the cell cycle. In a cell cycle, hand-held communication devices wake during time slots based on their geographical location (cell number). The second and third kinds, called the horizontal and vertical cycles respectively, are cycles in which hand-held communication devices wake during slots based on random IDs A and B.

Each hand-held communication device may be assigned to three subgroups. One assignment to a subgroup is based on the hand-held communication device's cell number. The assignments to the two remaining subgroups are based on a random assignment scheme. As shown in FIG. 3, a user within cell number two, having an IDA number 96 and an IDB number 34 belongs to subgroup 2, 96, and 34, respectively. Thus, a user wakes in slot 2 in the cell cycle, cell 96 in the horizontal cycle and slot 34 in the vertical cycle.

The paging cycles discussed above are grouped into time frames. Each time frame may include one or more of the paging cycles. In the example considered here, a time frame consists of 10 cycles, only one of which is a cell cycle based on non-geographic criteria. The remaining cycles, 1–9, may be based on non-geographic criteria. Those skilled in the art, however, will appreciate that different numbers of each kind of cycle can be accommodated in a particular time frame.

Figure 4:
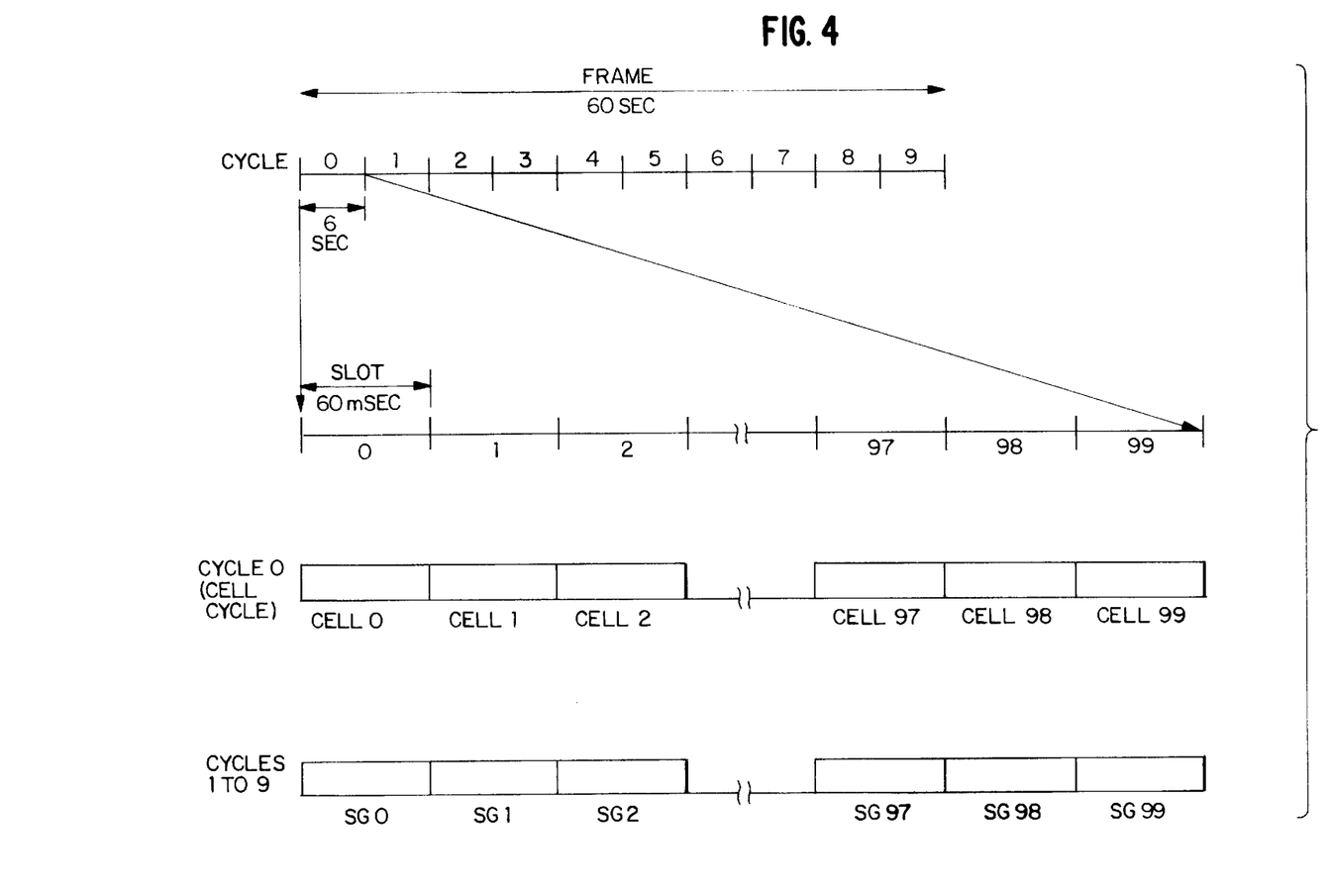
FIG. 4 is an illustration of time slot assignments associated with a particular cycle of a time frame according to a method of the present invention.

FIG. 4 illustrates a case in which a one minute time frame is divided into ten cycles of 6 seconds each, with the first cycle (cycle 0) being the cell cycle and the remaining cycles being based on non-geographic criteria. Each cycle is divided into 100 slots of 60 msec each. Each slot, in turn, is reserved for transmissions which are intended for a particular subgroup.

During the cell cycle, a beam is targeted at a portion of a specific cell so that paging bursts can be transmitted in each slot in such a way that the beam transmitted during slot i attempts to cover only a part of cell i. Other parts of cell i are targeted in subsequent cell cycles.

Each beam is targeted only once during a cell cycle, but may cover a larger area than the paging cell which is being targeted in a particular cycle. Taken in aggregate, the beams transmitted by the non-geostationary satellites cover every cell in the geographic region blanketed by beam transmissions from the non-geostationary satellites.

This guarantees that a user's hand-held communication device that is awake in the satellite beam footprint during the entire cell cycle will receive a paging burst during each cell cycle. Thus, a user's hand-held communication device will be able to synchronize to the system even from a cold start.

Alternatively, if a hand-held communication device within a paging cell needs to be synchronized occasionally because of clock drift within the device, that device will be able to receive a synchronization signal after a number of time frames have passed during which the entire paging cell has been covered by beams transmitted by the non-geostationary satellites. An illustration of this concept is presented in FIGS. 5A–5C.

Figure 5A:
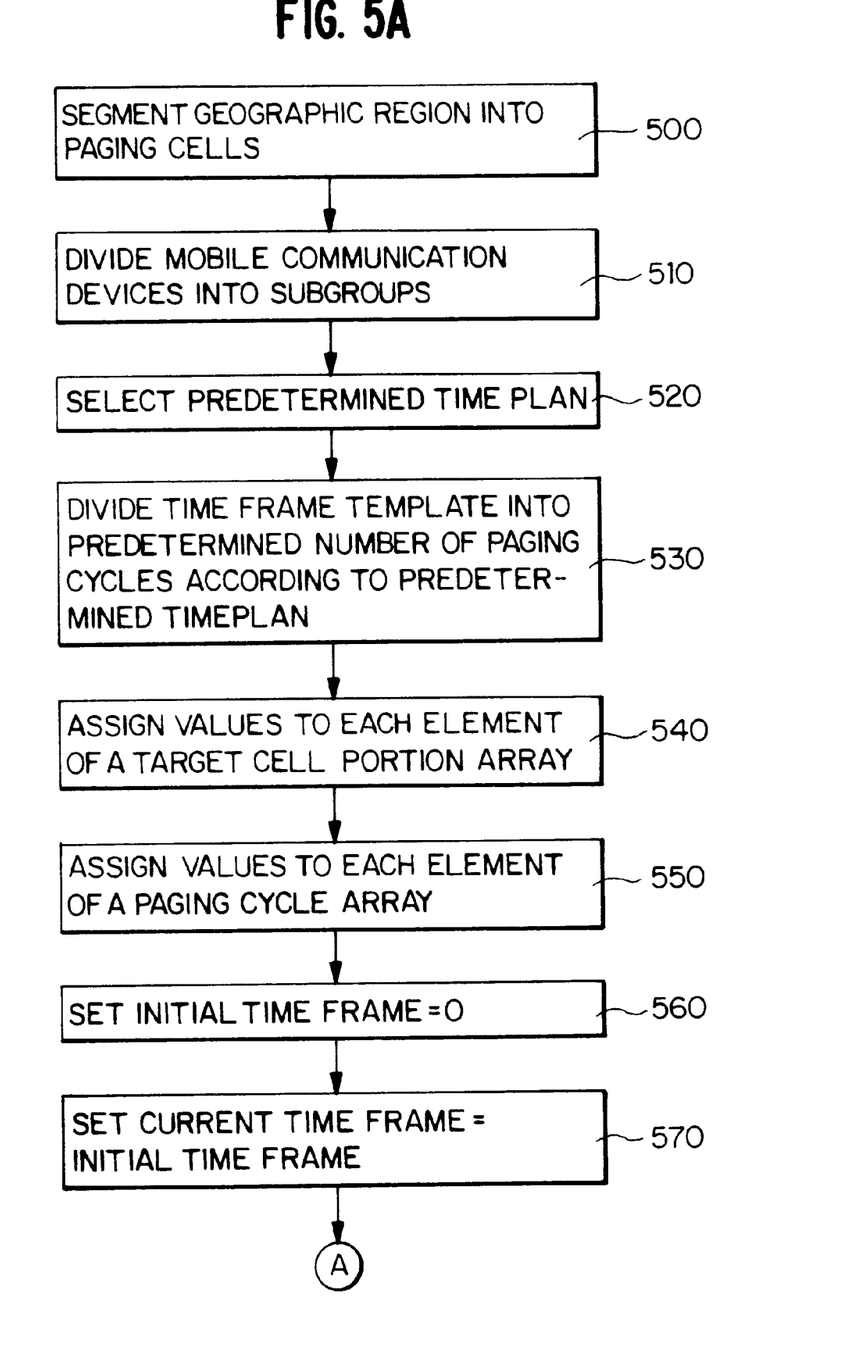
FIGS. 5A–5C show a flow chart incorporating a method of the present invention that can be implemented in software.
Figure 5B:
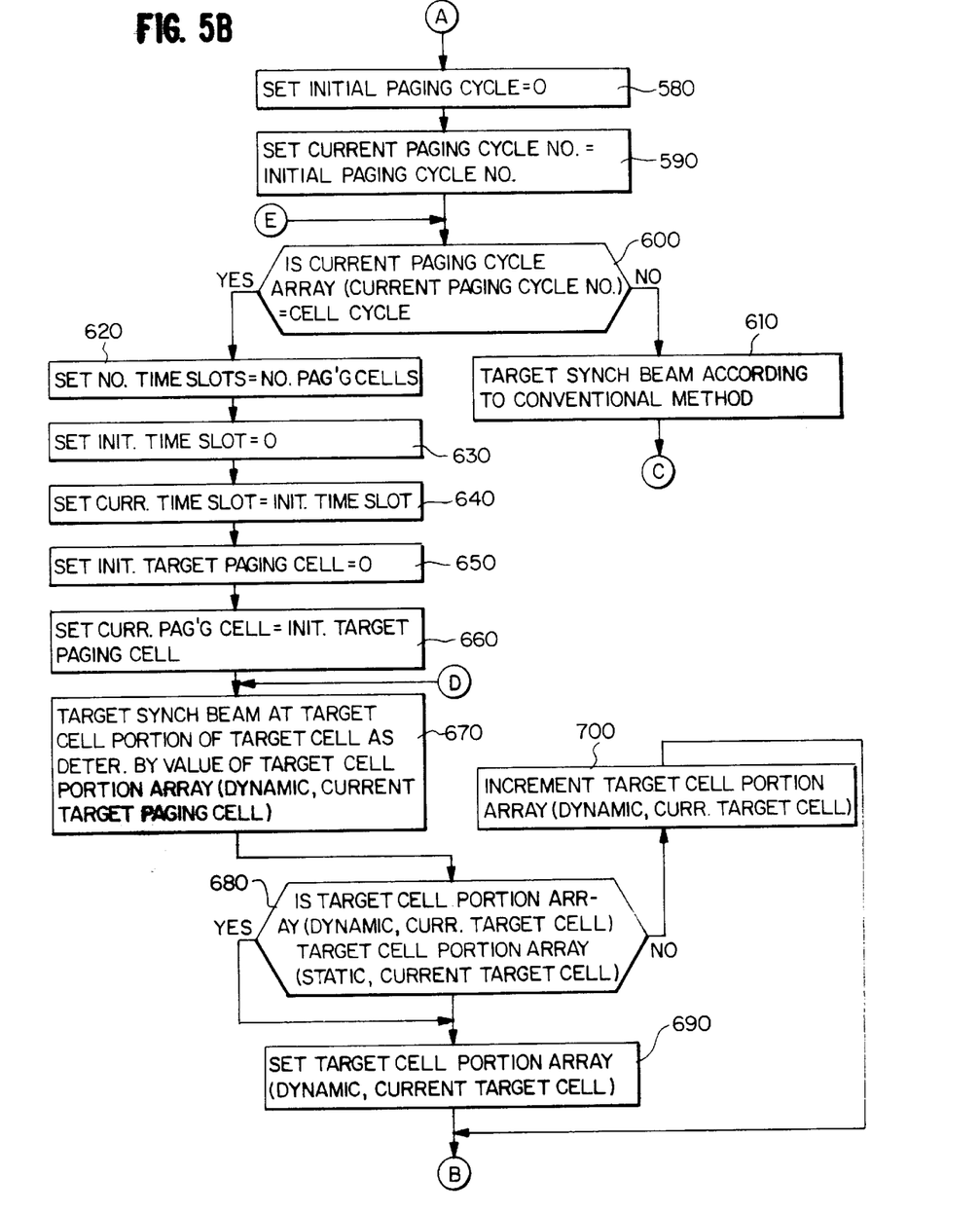
Figure 5C:
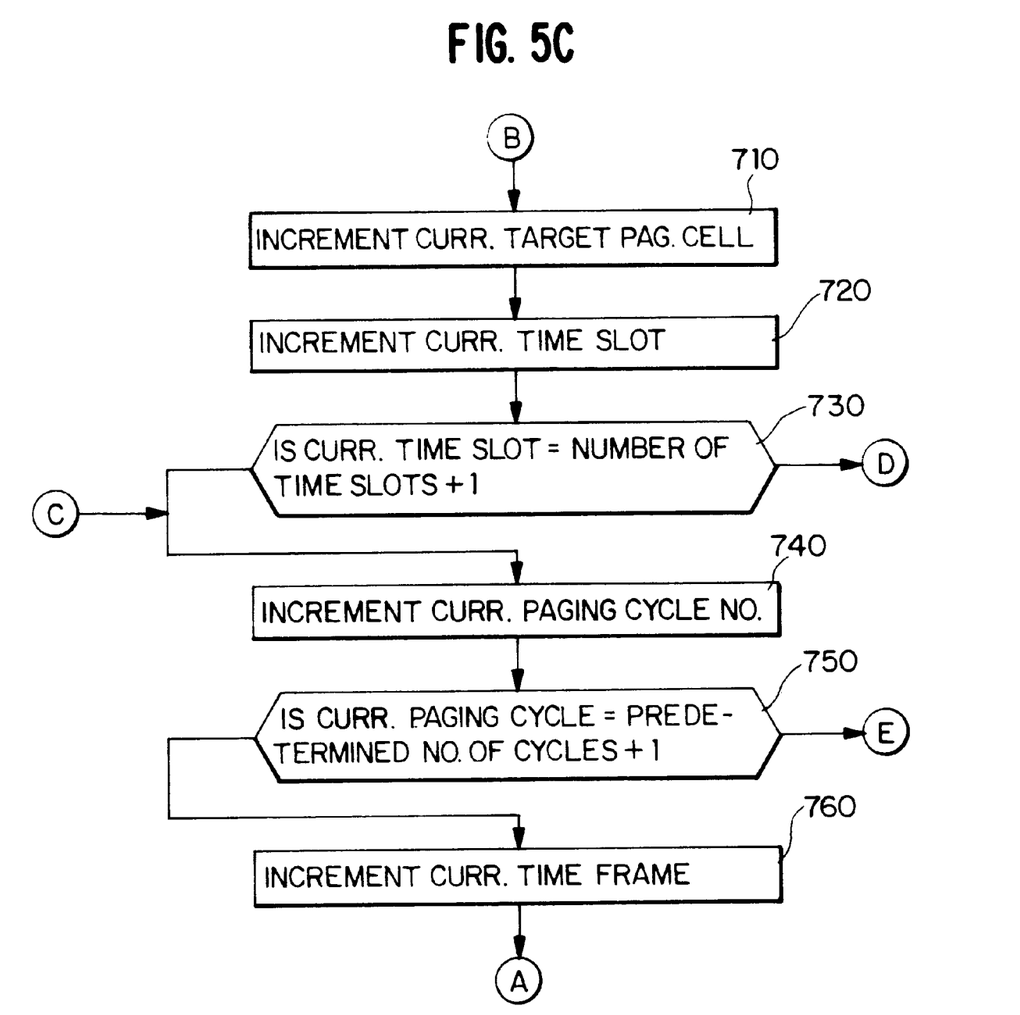

FIGS. 5A–5C depict a flow chart embodying a method according to the present invention. This flowchart may be implemented in software which is run on a computer that is either located in a SAN or on board a non-geostationary satellite employed in the non-geostationary satellite communication system.

In step 500, shown in FIG. 5A, a geographic region is segmented into a predetermined number of paging cells. Next, in step 510, mobile communication devices employed in the non-geostationary satellite communication system are divided into a predetermined number of subgroups based on their location within the paging cells. After the mobile communication devices are divided into subgroups, a time plan is selected in step 520.

The time plan establishes the way that mobile communication devices will be synchronized over time as a function of their location within paging cells which are part of a particular geographic region. In accordance with the time plan, time frames are established during which synchronization beams are transmitted from the non-geostationary satellites to the mobile satellite communication devices.

In step 530, a time frame template is divided into a predetermined number of paging cycles in accordance with the time plan. During each time frame, the time frame template will be used to coordinate the activity of the SANs, satellites, and mobile communication devices.

In step 540, values are assigned to each element of a target cell portion array. The target cell portion array is a two-dimensional array. Each dimension of the array is defined by a target data type which can be either static or dynamic. The first or static dimension of the array contains a number of elements equal to the number of target paging cells. Each element in the static dimension defines the number of target paging cell portions that constitute each one of the target paging cells.

The second or dynamic dimension of the array also contains a number of elements equal to the number of target paging cells. However, each element in the dynamic dimension defines the number of target paging cell portions which have been covered by non-geostationary satellite synchronization beams up to the period of time coinciding with the current time frame.

In step 550, values are assigned to each element of a paging cycle array. The paging cycle array is a one-dimensional array which contains a number of elements equal to the number of paging cycles contained within a time frame. Each element in the paging cycle array defines the type of each paging cycle contained within a time frame.

In step 560, an initial time frame is set to zero. A current time frame is set equal to the initial time frame in step 570. Next, the paging cycle number is set equal to zero in step 580, as shown in FIG. 5B, and in step 590 the current paging cycle is set equal to the initial paging cycle number.

In step 600, the value stored in the paging cycle array that is associated with the element corresponding to the current paging cycle number is checked in order to ascertain whether the current paging cycle is a cell cycle. If the current paging cycle is not a cell cycle, then in step 610 a satellite synchronization beam is targeted according to the conventional method previously described. After step 610 occurs, step 740 is performed as described below.

If the current paging cycle is a cell cycle, then in step 620 a number of time slots is set equal to the number of paging cells. In step 630 an initial time slot is set to zero. In the following step 640, a current time slot is set to the initial time slot.

In step 650, an initial target paging cell is set equal to zero, while, in step 660, a current target paging cell is set equal to the initial target paging cell.

In step 680, a first value stored in the dynamic domain of the target cell portion array that is associated with the element corresponding to the current target cell number is compared with a second value stored in the static domain of the target cell portion array that is associated with the element corresponding to the current target cell number.

If the first value is greater than the second value, the first value is set to zero. However, if the first value is not greater than the second value, the first value is incremented by one in step 700. Following either step 690 or step 700, the current target paging cell is incremented by one in step 710 and the current time slot is incremented by one in step 720.

In step 730, as shown in FIG. 5C, the current time slot is checked to see if its value exceeds the total number of time slots by one. If the value of the current time slot does not exceed the number of time slots by one, the next synchronization beam is targeted in accordance with step 670. However, if the value of the current time slot does exceed the number of time slots by one, the current paging cycle number is incremented by one in step 740.

In step 750, the current paging cycle number is checked to see whether it exceeds the predetermined number of paging cycles by one. If the current paging cycle number exceeds the predetermined number of paging cycles by one, then the current time frame is incremented in step 760. After step 760 is performed, step 580 is performed in which the initial paging cycle number is set to zero, as described above. However, if the current paging cycle number does not exceed the predetermined number of paging cycles by one, then step 600 is performed, as described above, in which the value stored in the paging cycle array that is associated with the element corresponding to the current paging cycle number is checked to see whether the current paging cycle is a cell cycle.

Figure 6:
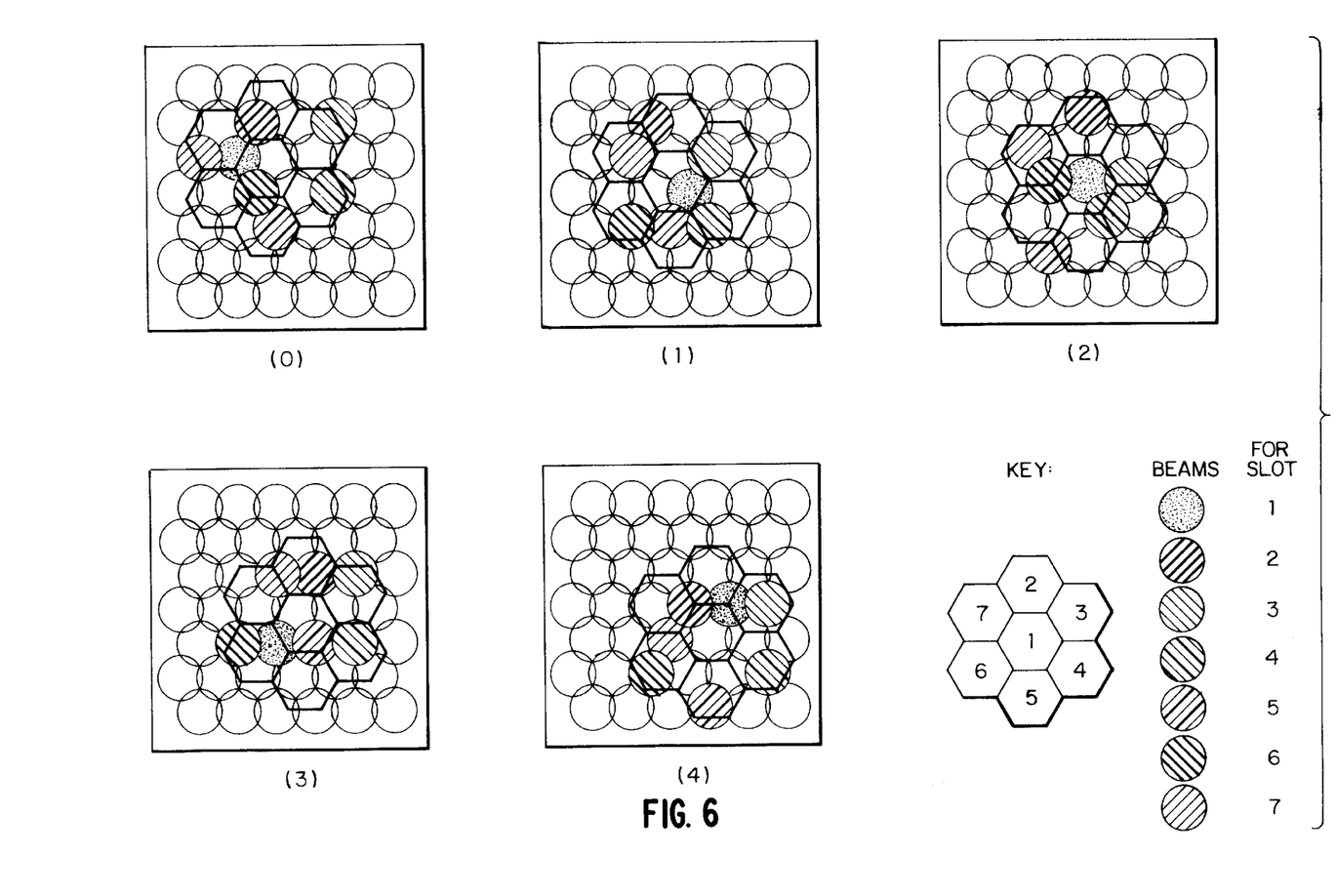
FIG. 6 shows the positioning of synchronization beams associated with specific time slots over the course of a number of time frames according to one embodiment of the present invention.

FIG. 6 depicts seven cells at nadir, numbered 1 to 7, and shows the state of those cells over the course of five time frames, numbered 0 to 4. During the course of the five time frame intervals, the relative position of the spot beams to the cells changes significantly, as shown in FIG. 6.

During the cell cycle of time frame 0, the paging burst transmitted in time slot 1 is assigned to a spot beam that partially overlaps cell 1 so as to cover a top left portion of that cell. Similarly, the paging burst transmitted in time slot 2 is assigned to a spot beam that partially overlaps cell 2 so as to cover a bottom left portion of that cell. The paging burst transmitted in time slot 3 is assigned to a spot beam that partially overlaps cell 3 so as to cover a top right portion of that cell. The paging burst in time slot 4 is assigned to a spot beam that partially overlaps cell 4 so as to cover a top right portion of that cell.

Next, the paging burst transmitted in time slot 5 is assigned to a spot beam that partially overlaps cell 5 so as to cover a central right portion of that cell. The paging burst transmitted in time slot 6 is assigned to a spot beam that partially overlaps cell 6 so as to cover a central right portion of that cell. Finally, the paging burst transmitted in time slot 7 is assigned to a spot beam that partially overlaps cell 7 so as to cover a lower left portion of that cell. Each beam is used only once during the cell cycle.

In frames 1–4, the relative position of each beam changes. For example, the paging burst transmitted in time slot 1 of frame 2 is assigned to a spot beam that partially overlaps cell 1 so as to cover a lower right portion of that cell. The paging burst transmitted in time slot 1 of frame 3 is assigned to a spot beam that partially overlaps cell 1 so as to cover a central portion of that cell. Finally, the paging burst transmitted in time slot 1 of frame 4 is assigned to a spot beam that partially overlaps cell 1 so as to cover a top right portion of that cell. Thus, after the completion of time frame 4, virtually all of cell 1 has been covered by the spot beams targeted towards the cells during time frames 0–4.

Figure 7:
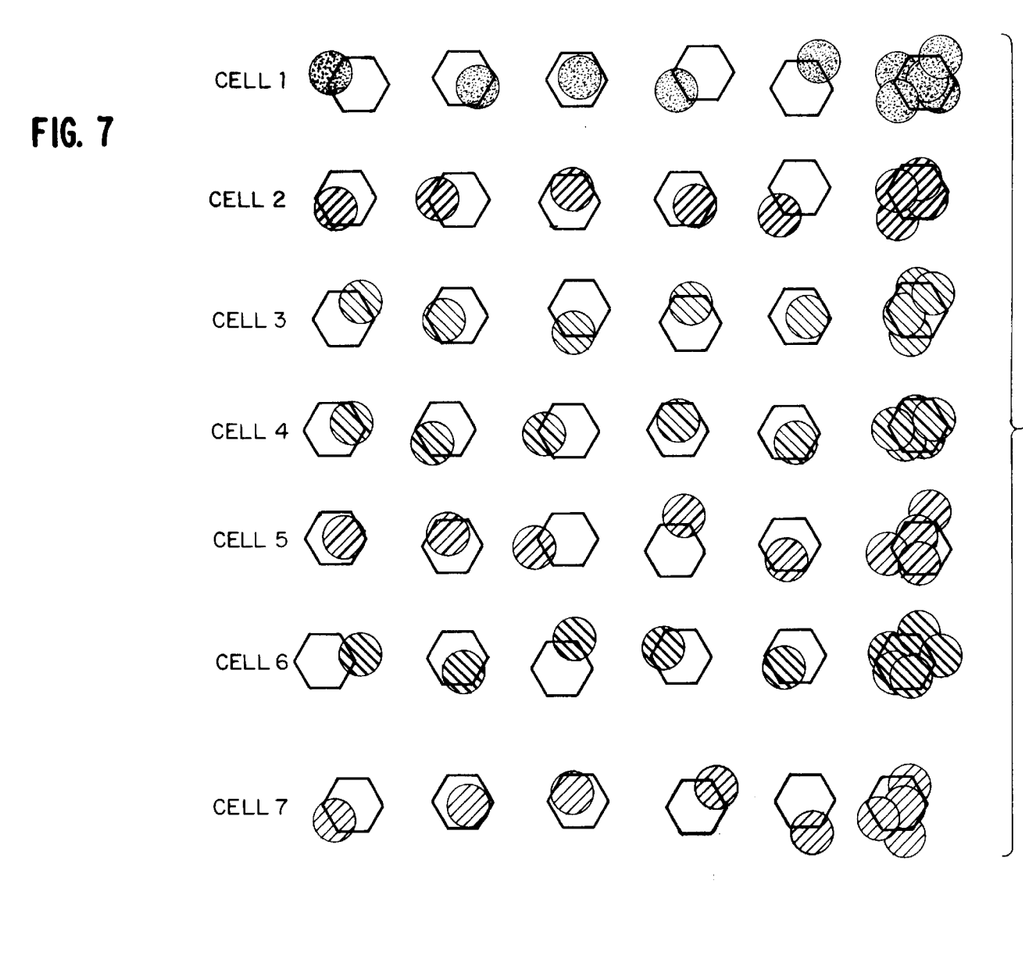
FIG. 7 shows the positioning of synchronization beams associated with specific time slots over the course of a number of time frames for each individual cell.

FIG. 7 illustrates how the spot beams cover different areas of a cell in each time frame. Also illustrated in FIG. 7 is the total area of each cell covered after five time frames. Note that after five time frames, each of the seven cells has been almost entirely covered. This means that a hand-held communication device in one of these cells that wakes up during its assigned wake slot (determined by the cell in which the device is positioned) will receive a paging burst to help the device maintain synchronization every five minutes or so.

While the above concept puts the burden of executing the mapping of beams-to-slots on the SANS, the complexity of the hand-held communication device is minimized. Furthermore, no indirect addressing with its potential malfunctions, are employed in the present invention.

Although the preferred embodiments of the present invention have been described, the spirit and scope of the invention is by no means restricted to what is described above. For example, as noted previously, the paging time plan may use a mixture of geographical and non-geographical based cycles.

What is claimed is:

1. A method of synchronizing mobile communication devices employed in a non-geostationary communication system according to a paging time plan using geographical paging cells, the method comprising the steps of:

segmenting a geographical region into a plurality of said geographical paging cells, dividing said mobile communication devices into subgroups according to a location of ones of said mobile communication devices in one of said geographical paging cells, and transmitting a plurality of beams from non-geostationary satellites to said mobile communication devices positioned within said geographical paging cells according to said paging time plan, wherein each of said beams is transmitted once during at least one time frame including at least one paging cycle having a plurality of time slots, wherein said time slots occur at fixed intervals relative to time slots occurring in paging cycles of subsequent frames, and wherein, during each of said plurality of time slots, one of said plurality of beams is targeted to at least a portion of one of said plurality of geographical paging cells not targeted by other ones of said plurality of beams so that mobile communication devices within the targeted cell may receive synchronization signals from said non-geostationary satellites.

2. The method of synchronizing mobile communication devices as defined in claim 1, wherein each of said beams is transmitted in a different order during a plurality of time frames.

3. The method of synchronizing mobile communication devices as defined in claim 1, wherein said plurality of beams cover all of said geographical region during each paging cycle so that mobile communication devices which are just powered on may receive synchronization signals from said non-geostationary satellites.

4. The method of synchronizing mobile communication devices as defined in claim 1, wherein said time slots are of equal length.

5. The method of synchronizing mobile communication devices defined in claim 1, wherein each time frame further comprises a paging cycle based on a non-geographic assignment scheme.

6. The method of synchronizing mobile communication devices defined in claim 1, wherein said plurality of beams originate from a plurality of earth stations, and are transmitted to said mobile communication devices via said plurality of non-geostationary satellites.

* * * * *